United States Patent [19]
Bradford et al.

[11] 3,981,782
[45] Sept. 21, 1976

[54] ELECTROPLATING OF GOLD AND GOLD COMPOUNDS THEREFOR

[75] Inventors: Christopher William Bradford; Harry Middleton, both of London, England

[73] Assignee: Johnson Matthey & Co., Limited, London, England

[22] Filed: Apr. 17, 1975

[21] Appl. No.: 568,838

Related U.S. Application Data

[63] Continuation-in-part of Ser. No. 382,111, July 24, 1973, abandoned.

[52] U.S. Cl. ............................ 204/46 G; 423/23
[51] Int. Cl.² ..................... C25D 3/48; C01G 7/00
[58] Field of Search .......... 423/23; 204/43 G, 46 G; 75/108, 118 R

[56] References Cited
UNITED STATES PATENTS

| | | | |
|---|---|---|---|
| 3,475,292 | 10/1969 | Shoushanian | 204/44 |
| 3,666,640 | 5/1972 | Smith | 204/44 |
| 3,776,822 | 12/1973 | Baker | 204/46 G |

*Primary Examiner*—G. L. Kaplan
*Attorney, Agent, or Firm*—Cushman, Darby & Cushman

[57] ABSTRACT

This invention relates to gold compounds useful in electroplatings and which are obtained by reacting an alkali metal gold sulphite with an alkali metal nitrite.

14 Claims, No Drawings

ELECTROPLATING OF GOLD AND GOLD COMPOUNDS THEREFOR

This application is a continuation-in-part of our application No. 382,111, filed July 24, 1973 and now abandoned.

This invention relates to the production of gold compounds for use in electroplating, to gold plating salts containing said compounds and to the use of said gold compounds and gold plating salts in electroplating.

Most gold plating is at present done from cyanide containing electrolytes. These are poisonous and consequently need to be handled with care. They are also rather difficult to dispose of with safety.

Certain essentially non-poisonous gold plating electrolytes which do not contain cyanide have been proposed in the past but have met with only limited success. These have typically contained sulphites, citrates or phosphates.

We have now found that non-cyanide-containing gold plating electrolytes may be formed by dissolving in water a gold compound formed by a method which includes the step of causing a sulphite of gold such as an alkali metal-gold sulphite to react with an alkali-metal nitrite. Typically, the sulphite of gold and the nitrite mentioned above are caused to react by heating a solution containing both of them, for example to about 50°C, for a short time.

According to the invention we provide a gold compound formed by a reaction between an alkali metal gold sulphite and an alkali metal nitrite. The resulting compounds are believed to be co-ordination compounds.

We also provide a method of preparing a plating salt which is a mixture of a gold compound of this invention and the alkali metal nitrite used in its preparation, comprising heating an aqueous solution of an alkali metal gold sulphite and an excess of the said nitrite.

We have further now found that the gold compounds of the invention can be very conveniently obtained by forming the alkali metal gold sulphite in situ by the reaction of an alkali metal gold halide and sulphur dioxide. In this latter method said halide is subjected to the action of sulphur dioxide, and the resulting product (containing the alkali metal gold sulphite) is treated with an alkali metal nitrite.

In this method of preparation the alkali metal of said alkali metal gold halide is conveniently sodium or potassium and said halide is conveniently chloride or bromide. Thus, for example, said alkali metal gold halide can be sodium gold chloride (or sodium chloroaurate), sodium gold bromide (or sodium bromoaurate), potassium gold chloride (or potassium chloroaurate) or potassium gold bromide (or potassium bromoaurate).

The sulphur dioxide to which the alkali metal gold halide is subjected is conveniently brought into contact with said gold halide by passing gaseous sulphur dioxide ($SO_2$) through an aqueous solution of said halide, made alkaline by the addition to it, for example, of an aqueous solution of alkali metal hydroxide such as sodium hydroxide. A suitable pH value for such an aqueous solution before the passage therethrough of sulphur dioxide is 12 or more. Although the sulphur dioxide can be brought into contact with said gold halide in other ways, the use of a stream of sulphur dioxide generated outside the reaction mixture is very convenient, and the description that follows is with reference to that procedure. The passage of the sulphur dioxide is normally continued until the reaction medium becomes substantially colourless. It is believed that at this stage the reaction mixture contains an alkali metal gold sulphite.

The nitrite used to treat the product resulting from subjecting the alkali metal gold halide to sulphur dioxide is conveniently an alkali metal or other metal nitrite, for example, sodium or potassium nitrite. Since these latter nitrites are particularly soluble in water, they may conveniently be added in the solid form to the aqueous solution of the alkali metal sulphite. The particular alkali metal nitrite will quickly dissolve in the solution and the desired gold complex will be precipitated out. This procedure is conveniently carried out (especially where sodium nitrite is used) at a temperature in the range of 50°–60°C. The crude product obtained is preferably purified by reprecipitation.

In practice, the compound formed on precipitation and reprecipitation is usually associated with the nitrite used in the preparation of the compound. For example, the compound formed with sodium nitrite is usually associated with an equimolar amount of sodium nitrite.

The compound mixed with the salt as formed on precipitation or reprecipitation may be used as it is for electroplating, and such mixtures are referred to hereafter as "plating salts". The plating salt can, for example, be obtained by mixing in aqueous solution, a gold compound of the invention, a nitrite and optionally, a sulphite, for example sodium nitrite and optionally, sodium sulphite, and heating the resulting solution.

The gold compounds and/or the gold plating salts of this invention are used to produce gold-plating electrolytes. A brightener is preferably added to the electrolyte, which may be a composition formed from $As_2O_3$ and EDTA, for example, as hereinafter described. EDTA itself, or a salt thereof, may also be added.

If necessary an alkali is added to the electrolyte to adjust the pH of the electrolyte to approximately neutral or alkaline, and a buffer is added to combat a tendency of the electrolyte to become more acid as the electroplating proceeds. Electroplating may be carried out continuously by adding further plating salt and/or brightener, alkali, or buffer, as required.

The electrolyte may thus typically contain sodium nitrite and a gold compound formed by heating a solution containing sodium gold sulphite and sodium nitrite.

In practice, the gold compound of the invention formed on precipitation is usually obtained as a mixture with the nitrite used in its preparation. For example, the compound formed with sodium nitrite is precipitated as an approximately 1:1 molar mixture with sodium nitrite. Reprecipitation results in a similar product.

The gold compound mixed with the salt as formed on precipitation or reprecipitation may be used as it is for electroplating and such mixtures are referred to hereafter as "plating salts".

The electrolytes made from the plating salts of the invention may be prepared, for example, by dissolving sufficient of the plating salt in water to give a solution containing 0.1–50 g/l Aau but preferably 2–30 g/l Au. Further, sodium nitrite or other alkali metal salt compatible with the bath can also be added. Sodium hydroxide or another alkali is added to adjust the pH to the required figure (normally corresponding to approximately neutral or alkaline conditions). Since the pH falls during plating, a buffer should normally be used: for example, $Na_2B_4O_7$ (borax), $Na_2HPO_4$ or $NaHCO_3$ (but preferably $Na_2B_4O_7$) for operation in the range pH 9–11 or, for example, sodium acetate $CH_3COONa$ for operation under approximately neutral conditions. The buffer concentrations is normally of the order of 10 g/l.

Gold electrodeposits from these solutions are improved by the addition of chelating agents such as EDTA (ethylenediamine tetracetic acid) this may be used as such but it is normally added as the sodium or other salt of EDTA.

To obtain bright deposits of gold the addition of a brightener is normally required. Preferred brighteners are those containing arsenic, antimony or selenium. Proprietary brighteners of this type are available, but the most satisfactory brightener can be simply prepared by reaction of $As_2O_3$ with EDTA, as hereinafter described.

As mentioned previously, electrolytes using the nitrosulphite gold plating salt can be satisfactorily operated through many turnovers of the metal content by making appropriate replenishments of the gold content with further plating salt, and of the brightener when required, and adjustment of the pH if necessary. The electrolytes will operate at current densities of 0.20 asf. and temperatures of 60°C, but can be operated at even higher current densities under conditions of high gold concentration and vigorous agitation.

Base metals which co-deposit with gold, e.g. cadmium, copper, nickel and cobalt may also be added to the bath, preferably as EDTA complexes.

Some embodiments of the invention will now be described in more detail in the following Examples 1 to 16.

EXAMPLE 1.

A solution of 17.5g gold as sodium gold sulphite and 125g sodium nitrite in 400 ml. of water was heated at the boiling point for 15 minutes. The resulting compound was precipitated and filtered off after cooling. Further quantities of this compound were obtained on evaporation. The total product, amounting to 45.2g was then dissolved in 50 ml. hot water and reprecipitated on cooling, the 50 ml. of water containing 5g of sodium nitrite to aid the reprecipitation.

EXAMPLE 2

Excess sodium nitrite (approximately 2.5g per gram of gold) was added to a solution of sodium gold sulphite (containing 90 g/l Au) and the solution stirred and warmed to 50°C. The yellow precipitate was filtered off at regular intervals until no more precipitated. The crude product was reprecipitated by dissolving in a small volume of water followed by addition of sodium nitrite (approximately 2g per gram of gold) and gentle heating. The pure product was filtered off, washed with acetone and allowed to dry at room temperature. The overall yield was 98.5%.

Although it is preferable to reprecipitate, the crude product can be used directly for plating purposes.

Prepared as described above the infrared spectrum of the plating salt showed peaks attributable to nitro groups, (1345m, 1300s and 824cm$^{-1}$ assignable to $\nu_s(NO_2)$, $\nu_{as}(NO_2)$ and $\delta(NO_2)$ respectively), to nitrite ions (1260s, 831w cm$^{-1}$ assignable to $\nu as(NO_2^-)$ and $\delta(NO_2^-)$) and to sulphito groups (1069s, b, 973s and 643s cm$^{-1}$). Weak water peaks were also observed. This suggested the presence in the plating salt of both a nitrocompound and nitrite ions. A possible explanation was the presence of sodium nitrite.

The X-ray powder pattern of the product of Example 2 showed that the structure of the gold plating salt was based on an orthorhombic unit cell with lattice parameters $a = 8.6A$, $b = 10.38A$ and $c = 15.36A$. The lines which did not agree with these parameters were indexed to $NaNO_2$.

The splitting of two of the peaks assigned to the complex was found to increase slightly as the amount of free nitrite in the material increased. This may have been due to a small amount of nitrite entering the unit cell and causing a lattice expansion.

A sample of the mixture was slurried with a small volume of water and sucked dry on a Buchner filter. This treatment was repeated several times until the weight of the residue was only about 10% of that of the starting material. The residue was dried with acetone and its infrared spectrum no longer showed the nitrite or water peaks although the nitrite and sulphito peaks were still present. This suggested that the nitrite had been preferentially dissolved out as sodium nitrite. Analysis of the residue (i.e. the pure nitrosulphite gold complex) indicated the presence of one nitro and two sulphito groups per gold atom.

| | Na | Au | S | N | O | H |
|---|---|---|---|---|---|---|
| Found | 19.0 | 39.2 | 12.6 | 2.9 | 28.2 | 0.0 |
| $Na_4Au(SO_3)_2(NO_2)$ requires | 18.6 | 39.8 | 12.9 | 2.8 | 25.9 | 0.0 |

Although the analysis fits the formula $Na_4Au(SO_3)_2(NO_2)$ reasonably well the exact nature of the complex is still not understood. One of the sulphito ligands may be cidentate.

Analysis of the original plating salt suggested the presence of approximately equimolar amounts of $Na_4Au(SO_3)_2(NO_2)$, $NaNO_2$ and $H_2O$ although results differed slightly from batch to batch due presumably to the presence of varying amounts of sodium nitrite. A typical analysis was as follows:

| | Na | Au | S | N | O | H |
|---|---|---|---|---|---|---|
| Found | 21.5 | 34.4 | 11.9 | 4.2 | 30.0 | 0.3 |
| $Na_4Au(SO_3)_2(NO_2).NaNO_2.H_2O$ requires | 19.8 | 33.8 | 11.0 | 4.8 | 30.2 | 0.4 |

The sodium EDTA solution for use in connection with the invention can be prepared by adding solid NaOH to a 400 g/l slurry of EDTA in water until pH 11 is reached. Addition of this concentrate can be made to the electrolytes and examples of its use are given below.

The arsenic brightener referred to above which can be used as an additive to the plating bath may be made by adding $Na_2$ EDTA (18.8g) to $As_2O_3$ (4g) in water (50ml) and maintaining the mixture at its boiling point for 10 minutes. The solution is then adjusted to pH 10 with NaOH, filtered and diluted to 150ml to give a solution with an arsenic concentration of 20 mg/ml. Additions of this brightener solution may be made to electrolytes as described in the following examples. It has been used to give arsenic concentrations of 5 to 1000 mg/l in the electrolytes.

In Examples 3 to 8 plating experiments were carried out in 150 ml beakers using 1×1 inch (Examples 3 and 4) or 2×1 inch (Examples 5–8) copper panels with 2×1¼ inch platinum anodes on each side ¾ inch from the cathode. The sample of the sodium nitrosulphite gold plating salt used contained 31.1% Au and sufficient of this was dissolved to give the gold concentrations quoted in the Examples. The electrolytes were operated at 20°C and not stirred unless stated.

EXAMPLE 3

A solution was prepared containing 10 g/l Au as the nitrosulphito salt and 33 g/l $NaNO_2$; the pH was 9.9. A current of 0.05 amp (3.6 asf) was passed for 900 seconds. The weight of gold deposited was 0.0872g (i.e. $138 \times 10^{-6}$ inch thick on each side). The deposit was adherent, matt in appearance and had a low porosity. During the course of the electrolysis the pH fell to 7.6. The bath operated with a cathode efficiency of 94.9%.

EXAMPLE 4

A solution was prepared containing 10 g/l Au as the nitrosulphito salt, 10 g/l $NaNO_2$, 1 g/l antimony potassium tartrate and 6.7 ml/l glycerol. The pH was adjusted to 12 with sodium byroxide. A current of 0.2 amps (14.4 asf) was passed for 600 seconds. A bright but stressed deposit of gold was obtained. The weight of gold deposited was 0.1172g (i.e. $185 \times 10^{-6}$ inch thick on each side). During the course of the electrolysis the pH fell to 9.2. The bath operated with a cathode efficiency of 47.8%.

EXAMPLE 5

A solution was prepared containing 10 g/l Au as the nitrosulphito salt, 10 g/l NaOH and 10g/l $Na_2B_4O_7$; the pH was 10.4. A current of 0.04 amp (1.44 asf) was passed for 1200 seconds. The weight of gold deposited was 0.0869g (i.e. $69 \times 10^{-6}$ inch thick on each side). The deposit was adherent and had a matt brown appearance. The pH remained at 10.4 throughout the electrolysis. The bath operated with a cathode efficiency of 88.7%.

EXAMPLE 6

A solution was prepared containing 10 g/l Au as the nitrosulphito salt, 10 g/l NaOH, 10 g/l $Na_2B_4O_7$ and 100 ml l/l of a sodium EDTA solution prepared as described above. The pH was 11.4. A current of 0.04 amp (1.44 asf) was passed for 1200 seconds. The weight of gold deposited was 0.0961g (i.e. $76 \times 10^{-6}$ inch thick on each side). The deposit was adherent and has a brightish matt appearance. During the course of the electrolysis the pH fell to 11.3. The bath operated with a cathode efficiency of 98.1%.

EXAMPLE 7 i. A solution was prepared containing 15 g/l gold as the nitrosulphito salt, 10 g/l NaOH, 10 g/l $Na_2B_4O_7$, 100 m/l of the sodium EDTA solution and 2 ml/l of the arsenic brightener prepared as described above (i.e. the electrolyte contained 40 mg As/l). The pH was 11.4. A current of 0.02 amp (0.72 asf) was passed for 3600 seconds. The weight of gold deposited was 0.1401g (i.e. $111 \times 10^{-6}$ inch on each side). The deposit was adherent and very bright in appearance. During the course of the electrolysis the pH fell to 11.3. The bath operated at a cathode of efficiency of 95.3%.

ii. A solution similar to that in (i) was prepared but with 6 ml/l of the arsenic brightener (i.e. 120 mg As/l). The solution was stirred and a current of 0.08 amp (2.88 asf) was passed for 6200 seconds. The weight of gold deposited was 0.8630g (i.e. $682 \times 10^{-6}$ inch on each side). The deposit was adherent and very bright. During the course of the electrolysis the pH fell to 11.0. The bath operated at a cathode efficiency pf 85.2%.

iii. A further solution was prepared as in (ii) above. It was stirred and current of 0.06 amp. (2.16 asf) was passed for 5470 seconds. The weight of gold deposited was 0.636g (i.e. $501 \times 10^{-6}$ inch on each side). The deposit was adherent and very bright. During the course of the electrolysis the pH fell to 11.1. The bath operated at a cathode efficiency of 94.7%.

EXAMPLE 8

A solution was prepared containing 10 g/l Au as the nitrosulphito salt, 33.3 g/l sodium acetate, 100ml/l of the sodium EDTA solution and 6 ml/l of the arsenic brightener (i.e. 120 mg as AS/l). The pH was adjusted to 6.7 with NaOH. On standing some gold was deposited from the solution and this was filtered off. The solution was stirred and a current of 0.05 amp (1.8 asf) was passed for 3700 seconds. The weight of gold deposited was 0.3733g (i.e. $295 \times 10^{-6}$ inch on each side). The deposit was adherent and very bright. During the course of the electrolysis the pH fell to 6.5. The bath operated at a cathode efficiency of 98.8%.

Other plating salts were prepared (Examples 9 to 14) by addition of other complexing salts to a sodium gold sulphite solution containing 90 g/l Au and heating the mixtures. 2.5 g of the complexing salts were used per gram of gold. The products were not precipitated before use.

The plating experiments were carried out in 150 ml beakers using 1×1 inch (Examples 9 and 14) or 2×1 inch (Examples 10 – 13) copper panels with 2×¼ inch platinum anodes on each side, thirty-one/forty-four from the cathode. The electrolytes were operated at 20°C and not stirred unless stated.

EXAMPLE 9

A solution was prepared containing 10 g/l Au as the plating salt obtained using sodium carbonate. The pH was adjusted to 12.4 with NaOH and 10 g/l $Na_2B_4O_7$ and 100 ml/l of the sodium EDTA solution added. A current of 0.04 amp (2.88 asf) was passed for 3600 seconds. The weight of gold deposited was 0.2144 g (i.e. $339 \times 10^{-6}$ inch thick on each side. The deposit had a bright brown matt appearance. During the course of the electrolysis the pH fell to 11.9. The bath operated with a current efficiency of 72.9%.

EXAMPLE 10.

A solution was prepared containing 10 g/l Au as the plating salt obtained using sodium cyanate. The pH was adjusted to 12.0 with NaOH. A current of 0.02 amp (0.72 asf) was passed for 3600 seconds. The weight of gold deposited was 0.0819 g (i.e. $65 \times 10^{-6}$ inch thick on each side). The deposit had a dull brown appearance. During the course of the electrolysis the pH fell to 9.2. The bath operated with a current efficiency of 55.7%.

EXAMPLE 11.

A solution was prepared containing 10 g/l Au as the plating salt obtained using sodium citrate. The pH was adjusted to 11.9 with NaOH. A current of 0.02 amp (0.72 asf) was passed for 3600 seconds. The weight of gold deposited was 0.1020 g (i.e. 80.5×10⁻⁶ inch thick on each side). The deposit had a dull brown appearance. During the course of the electrolysis the pH fell to 9.0. The bath operated with a current efficiency of 69.4%. During the electrolysis some gold metal precipitated in the main body of the electrolyte.

EXAMPLE 12

A solution was prepared containing 10 g/l Au as the plating salt obtained using sodium oxalate. The pH was adjusted to 12.1 with NaOH. A current of 0.02 amp (0.72 asf) was passed for 3600 seconds). The weight of gold deposited was 0.1086 g (i.e. 86×10⁻⁶ inch thick on each side). The deposit had a dull brown appearance. During the course of electrolysis the pH fell to 9.5The bath operated with a current efficiency of 73.9%.

EXAMPLE 13

A solution was prepared containing 10 g/l Au as the plating salt obtained using sodium tartrate. The pH was adjusted to 12.1 with a NaOH. A current of 0.02 amp (0.72 asf) was passed for 3600 seconds. The weight of gold deposited was 0.1124 g (i.e. 89×10⁻⁶ inch thick on each side). The deposit had a dull brown appearance. During the course of the electrolysis the pH fell to 9.7. The bath operated with a current efficiency of 76.5%.

EXAMPLE 14

A solution was prepared containing 10 g/l Au as the plating salt obtained using sodium formate. The pH was adjusted to 12.2 with NaOH. The solution was stirred and a current of 0.05 amp (3.6 asf) was passed for 1800 seconds. The weight of gold deposited was 0.0689g (i.e. 109 × 10⁻⁶ inch thick on each side). The deposit had a greenish appearance. During the course of the electrolysis the pH fell to 8.6. The bath operated with a current efficiency of 37.5%. During the electrolysis some gold metal precipitated in the main body of the electrolyte.

EXAMPLE 15

Sodium gold chloride (9g. at 49.9% Au) was dissolved in water (50 ml.) and concentrated NaOH solution (50 ml. containing 25 g. NaOH) added with stirring. The solution turned orange initially and then after 5 minutes, bright yellow. the pH was 13.8.SO₂ was bubbled through the solution until it became colourless. The pH was then 2.8 and the temperature had risen to 55°C. (N.B. At pH 9 an orange-yellow precipitate was obtained which redissolved as further SO₂ was bubbled through). NaNO₂ (22.5 g.) was then added. The pH rose to 9.0. The solution was kept at 50°-60°C. with stirring for 30 minutes by which time dissolution of the nitrite and precipitation of the gold salt was complete. The crude product was filtered off, dissolved in water (50 ml.) and the solution warmed to 50°-60°C. Sodium sulphite (4.5 g.) and sodium nitrite (22.5 g.) were added and the solution held at 50°-60°C with stirring for 30 minutes. The reprecipitated product (14.6 g. at 29.2% Au) was filtered off and dried with acetone. The yield was 95%.

EXAMPLE 16

Sodium gold chloride (9 g. at 49.9% Au) was dissolved in water (15 ml.) and the solution added to NaOH solution (50 ml. containing 25 g. NaOH). The orange solution turned yellow after 5 minutes and its pH was 13.9. SO₂ was bubbled through the solution until the pH was 9.0. A small proportion (1.2 g. at 27.5% Au) of the orange-yellow precipitate was withdrawn and the SO₂ treatment was continued until the solution was colourless (pH 2.8). The nitrosulphite salt was then precipitated and reprecipitated as described in Example 15. The product (11.2 g.) contained 35.7% Au. The yield allowing for the intermediate removed, was 96%.

The infra-red spectra of the products of Examples 15and 16 were similar to those of the products of Examples 1and 2 prepared from sodium gold sulphite. The nitrite peak at 831 cm⁻¹ was strong in the case of the product of Example 15 (containing 29.2% Au) and weak in the product of Example 16(containing 35.7% Au). The spectrum of the orange-yellow intermediate suggested that it was a sulphite complex.

The plating salts obtained as products of Examples 15and 16 were used in plating baths using procedures similar to those of the earlier Examples and similar results were obtained.

We claim:

1. A gold compound obtained by reacting an alkali metal gold sulphite with an alkali metal nitrite, said compound having the empirical formula:

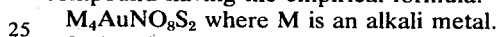
M₄AuNO₈S₂ where M is an alkali metal.

2. A gold compound obtained according to claim 1, in which the alkali metal nitrite is sodium nitrite.

3. A gold compound obtained according to claim 2, in which the alkali metal gold sulphite is sodium gold sulphite.

4. A gold compound obtained according to claim 1, in which an aqueous solution containing the alkali metal gold sulphite and the alkali nitrite has been subjected to elevated temperature.

5. A gold compound according to claim 1, which has the empirical formula:

Na₄AuNO₈S₂

6. A gold compound according to claim 1, which has the structural formula:
M₄Au(SO₃)₂(NO₂) where M is an alkali metal.

7. A gold compound according to claim 6, in admixture with alkali metal nitite.

8. A gold compound according to claim 1, which has the structural formula:

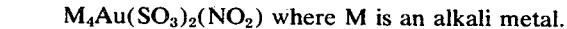
Na₄Au(SO₃)₂(NO₂)

9. A gold compound according to claim 8, in admixture with sodium nitrite.

10. A gold compound according to claim 1 in admixture with alkali metal nitrite.

11. A gold plating salt according to claim 1 having the following infra-red spectrum: Peaks attributable to nitro groups, (1345m, 1300s and 824w cm⁻¹ assignable to $\nu_s$(NO₂), $\nu_{as}$(NO₂) and δ (NO₂) respectively), to nitrite ions (1260s, 831w cm⁻¹ assignable to $\nu$ as(NO₂⁻ and δ (NO₂⁻) and to sulphite groups (1069s,b, 973s and 643s cm⁻¹).

12. A gold electroplating bath which comprises an aqueous solution of a gold compound according to claim 1 together with an alkali metal nitrite.

13. A gold electroplating bath according to claim 12, obtained by heating an aqueous solution of an alkali metal sulphite and the alkali metal nitrite.

14. A gold compound which has an empirical formula corresponding to Na₄Au(SO₃)₂(NO₂). NaNO₂. H₂O.

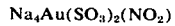

* * * * *

UNITED STATES PATENT OFFICE
CERTIFICATE OF CORRECTION

Patent No. 3,981,782      Dated September 21, 1976

Inventor(s) Christopher William Bradford and Harry Middleton

It is certified that error appears in the above-identified patent and that said Letters Patent are hereby corrected as shown below:

In the heading of the patent, add:

--[30]    Foreign Application Priority Data

July 28, 1972    Great Britain....35344/72--

Signed and Sealed this twelfth Day of July 1977

[SEAL]

Attest:

RUTH C. MASON
Attesting Officer

C. MARSHALL DANN
Commissioner of Patents and Trademarks